Nov. 17, 1953 W. F. ALLER 2,659,157
SIZE GAUGING DEVICE FOR V TYPE CYLINDER BLOCKS
Filed May 4, 1949 3 Sheets-Sheet 1

INVENTOR.
W. F. Aller
BY
Edward J. Nor Jr.
atty.

Nov. 17, 1953 W. F. ALLER 2,659,157
SIZE GAUGING DEVICE FOR V TYPE CYLINDER BLOCKS
Filed May 4, 1949 3 Sheets-Sheet 2

INVENTOR.
W. F. Aller
BY Edward J. Nos jr.
atty

Patented Nov. 17, 1953

2,659,157

UNITED STATES PATENT OFFICE 2,659,157

SIZE GAUGING DEVICE FOR V TYPE CYLINDER BLOCKS

Willis Fay Aller, Dayton, Ohio, assignor to The Sheffield Corporation, Dayton, Ohio, a corporation of Ohio Application May 4, 1949, Serial No. 91,333

7 Claims. (Cl. 33—178)

This invention relates to gauging apparatus and more particularly to apparatus for gauging articles according to size, the invention as herein disclosed being adapted for gauging the size of the cylinder bores of a V type cylinder block.

In accordance with the present invention a cylinder block or the like is supplied from a support to a rotatable carrier on which it is located in the gauging operation. Having been located, a series of gauging members enter the cylinder bores of one line of cylinders which may then be marked by the operator in accordance with the size indicated. The carrier is then rotated so as to bring the other line of cylinders into register with the gauging members and this second line of cylinders is then similarly gauged. The cylinder block is then moved endwise from the carrier and another block to be gauged is supplied to the carrier.

It is thus one object of the invention to provide a gauging apparatus in which a rotatable carrier is arranged between spaced block supports so that a cylinder block or the like may be moved horizontally from one block support to a gauging station on the carrier and from the carrier to the other block support, with gauging means arranged to enter bores in the block.

Another object is the provision of a gauging apparatus of the character mentioned having releasable locating means for positioning the carrier in either of two positions displaced 180 degrees apart.

Another object is the provision of a gauging apparatus having a series of block engaging heads for gauging the sizes of a series of holes in the block and a rotatable carrier for supporting the block in two different predetermined positions so that a single series of gauging devices may be successively applied to different series of bores in the block.

Another object is the provision of a gauging device of the character mentioned in which all the blocks entering gauging members may be simultaneously rotated by a common operating lever to gauge different diameters of the holes.

Other objects and advantages of the invention will be apparent from the following description, the appended claims and the accompanying drawings, in which Fig. 1 is a perspective view of a gauging apparatus embodying the present invention;

Figure 1:
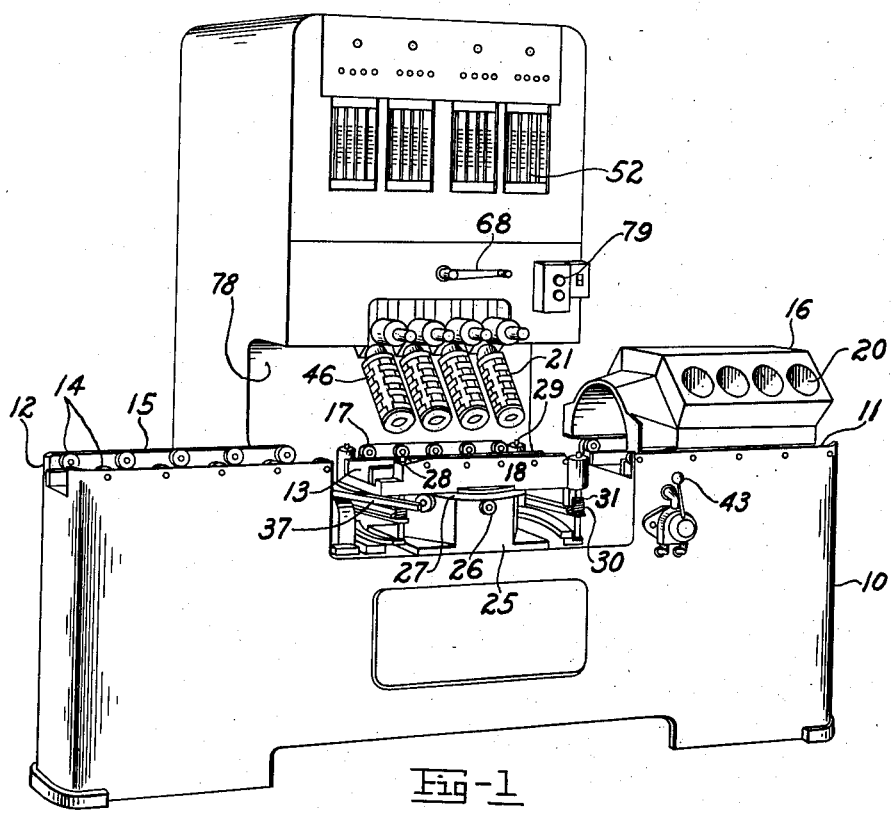

Referring more particularly to the drawing in which the same reference numerals are applied to like parts in the different views, 10 generally designates a base providing a pair of spaced block supports 11 and 12 between which is a rotatable carrier 13. The construction is such that a cylinder block may be applied to the block support 11 and then moved axially in a straight line of advance onto the carrier 13 where the gauging operation takes place, and may be moved from the carrier onto the block support 12 as another block is applied to the carrier. A series of rollers 14 carried by side rails 15 on the block supports 11 and 12 are adapted for engagement with the bottom flanges of the cylinder block 16 so that the block can be readily moved by the operator. Rollers 17 are also carried by the side rails 18 of the carrier and support the block while positioned on the carrier. The block supports 11 and 12 and the carrier are provided with spaced longitudinally extending guide rails 19 having tapered ends 19', the guide rails lying inside the lines of block supporting rollers and engaging the inner sides of the cylinder block with suitable operating clearance to position the cylinder block approximately centered with the line of travel through the gauging apparatus.

The cylinder block as herein shown is of the V type, having two angularly related series of cylinder bores 20 the axes of which are inclined relatively to the axis of symmetry of the cylinder block. Only one series of gauging heads 21 is required however, as the construction is such that after gauging one series of cylinder bores, the gauging heads are retracted, the cylinder block is rotated about a vertical axis by rotational movements of the carrier and the gauging blocks are then applied to the other series of cylinder bores. After the second series of cylinder bores are gauged, and without again rotating the carrier back to its initial position, the gauged block is moved from the carrier to the block support 12 and another block is supplied to the carrier. It is only necessary to rotate the carrier 180 degrees for each cylinder block gauged.

The carrier 13 is fixed to a centering shaft 23 which is journaled in a bearing 24 in a mount 25 on the base. A series of rollers 26 the axes of which radiate from the center of the shaft 23 are carried by the mount 25 and support a plate 27 to which the side rails 18 of the carrier are fixed. The rollers 26 thus take the weight of the carrier so that the carrier may be easily rotated about a vertical axis.

Spring pressed locating pins 28 and 29 are arranged at diagonally opposite corners of the carrier and are vertically movable from a retracted position into locating holes properly provided in the cylinder block flanges at equal distances from the center of the series of holes in the block. Springs 30 normally serve to project the locating pins upwardly, each spring engaging at one end against a collar 31 fixed to the pin and at the other end against one of the cross bars 32 which is supported by the carrier.

A locating plate 34 is fixed on the carrier at each of two diagonally opposite corners. Each locating plate has a notch 35 which is adapted to receive a lug 36 on arm 37 pivotally mounted on a shaft 40 which is journaled in the base. A tension spring 38 yieldingly holds the lug 36 in the recess to definitely position the carrier in either of two predetermined positions 180 degrees apart, in both of which the longitudinal axis of the cylinder block is properly arranged if the locating pins 28 and 29 are entered in the locating holes in the cylinder block, so that the gauging heads 21 are each aligned with one of the cylinder bores of one series of bores in the block. The operator may pull outwardly on the arm 37 to release the carrier for rotational movements about its vertical axis after completing a gauging operation on one series of cylinder bores so that he can then turn the carrier 180 degrees, accurately locate the carrier by again entering the lug 36 in the other locating plate 34, and the cylinder block will then be positioned for a gauging operation on the other series of cylinder bores.

Figure 2:
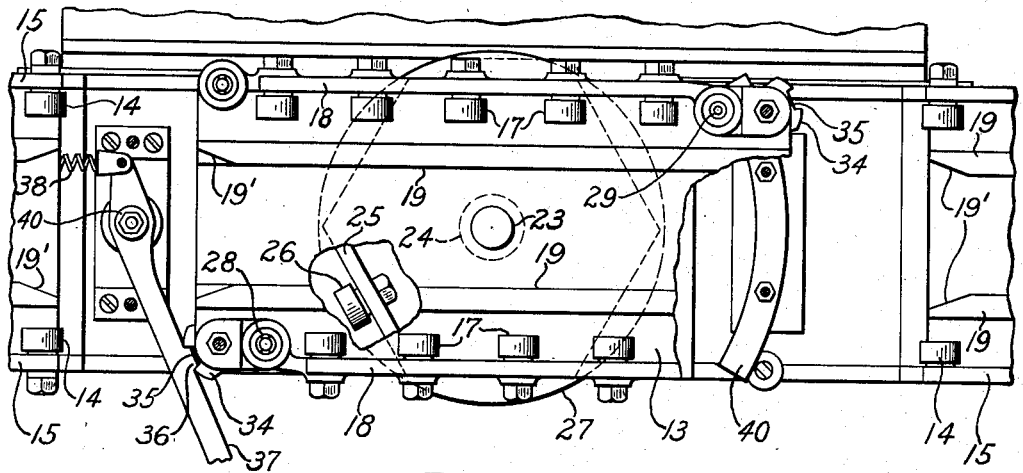
Fig. 2 is a top plan view of the block supporting carrier.
Figure 3:
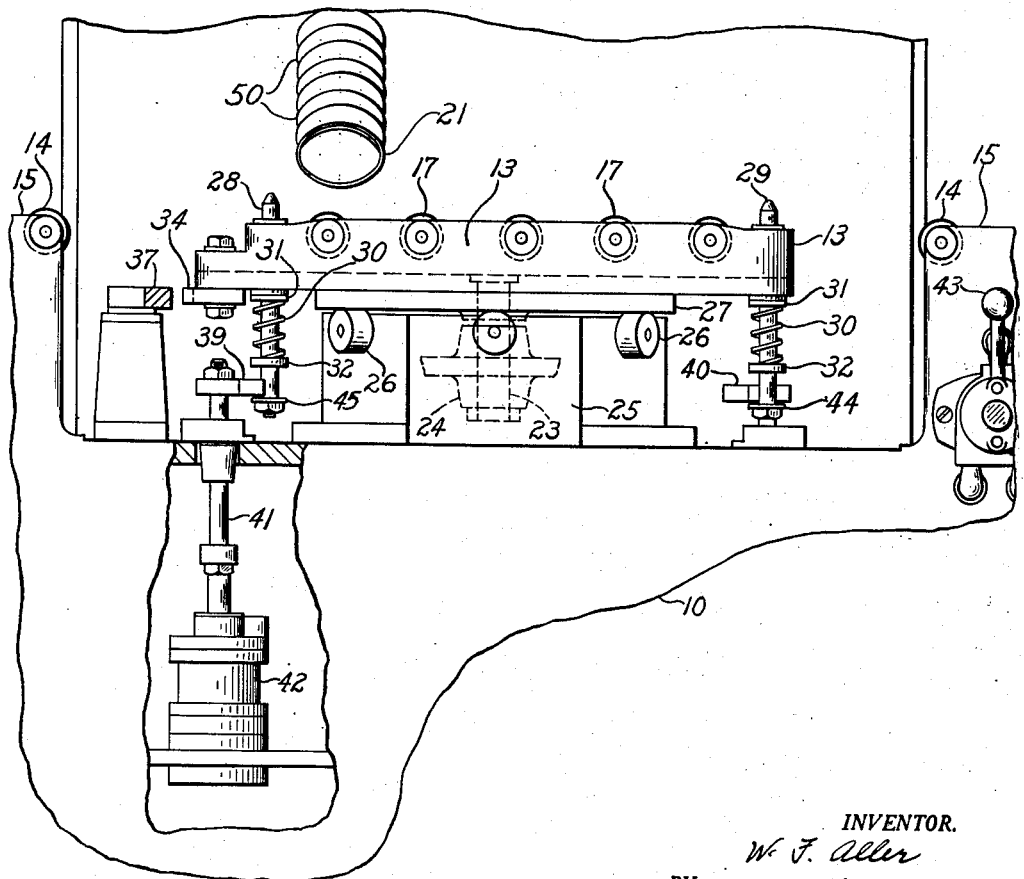
Fig. 3 is a front elevation of a portion of the gauging apparatus showing the carrier and associated parts.

Before the cylinder block is brought onto the carrier locating pins 28 and 29 are held in a down or retracted position by means of two retaining bars 39 and 40. These bars are each vertically movable on the base under the control of a fluid pressure operated rod 41 connected to a piston which operates in a fluid pressure cylinder 42 under the control of a hand lever 43 on the front of the base. When fluid pressure is supplied to the cylinders the rods are moved downwardly from the position illustrated in Fig. 3 so that the bars 39 and 40 acting against collars 45 and 44 on the locating pins 28 and 29 retract the locating pins against the action of the springs 30. After the cylinder block is rolled onto the carrier the control lever 43 is operated to raise the bars 39 and 40 and permit the locating pins 28 and 29 to be projected by their respective springs and locate the cylinder block in a precise predetermined position on the carrier. As will be apparent from Fig. 2 the bars that retract the locating pins are arcuately curved concentric with the axis of the shaft 23, the locating pins 28 and 29 remaining in their projected or operative position when the carrier is rotating.

The gauging heads 21 are illustrated in their projected positions in the drawing but normally they are held in an upper or retracted position. As shown more particularly in Fig. 4, each gauging head preferably comprises several gauging disks 46 capable of quite limited radial movement in any direction on spaced carrying posts 47 which are fixed to a flange 48 on operating bar 49. Each gauging disk has a pair of diametrically opposed gauging nozzles 50 the outer surfaces of which are slightly spaced away from the cylinder bore so that fluid leakage paths are provided between the nozzles and the cylinder base. The nozzles of each disk are in communication with a fluid passage leading to one of a series of hose 51 extending to fluid flow measuring tubes 52 a series of which is shown in Fig. 1. The measuring tubes are provided with floats which give the indication of the rate of flow of fluid coming from a fluid pressure regulated supply. The operator by noting the position of the floats in the measuring tubes can inspect each cylinder bore at four different locations and by comparison of the indication produced with the particular tolerance requirements, he can see whether a cylinder bore falls into any one of a series of different classifications phich may be, for example, a few ten-thousandths of an inch apart. Having noted the size of a cylinder bore the operator may rotate a stamping disk 53 having several numbers, 1 to 6 for example, so that the proper number designating some predetermined selection faces downward. The entire stamp is pivoted at 54 on the base so that the operator can raise the stamp and then permit it to drop and thus impress the proper classification figure on the top of the cylinder block adjacent the bore inspected, repeating this operation for each of the bores of the block so that pistons of the proper size can be selected in assembling the block into an engine.

Figure 5:
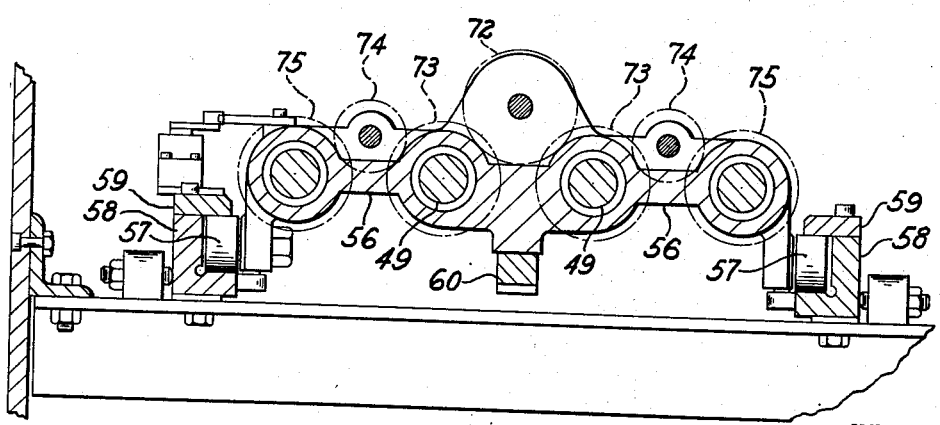
Fig. 5 is a section on the line 5—5 of Fig. 4.
Figure 4:
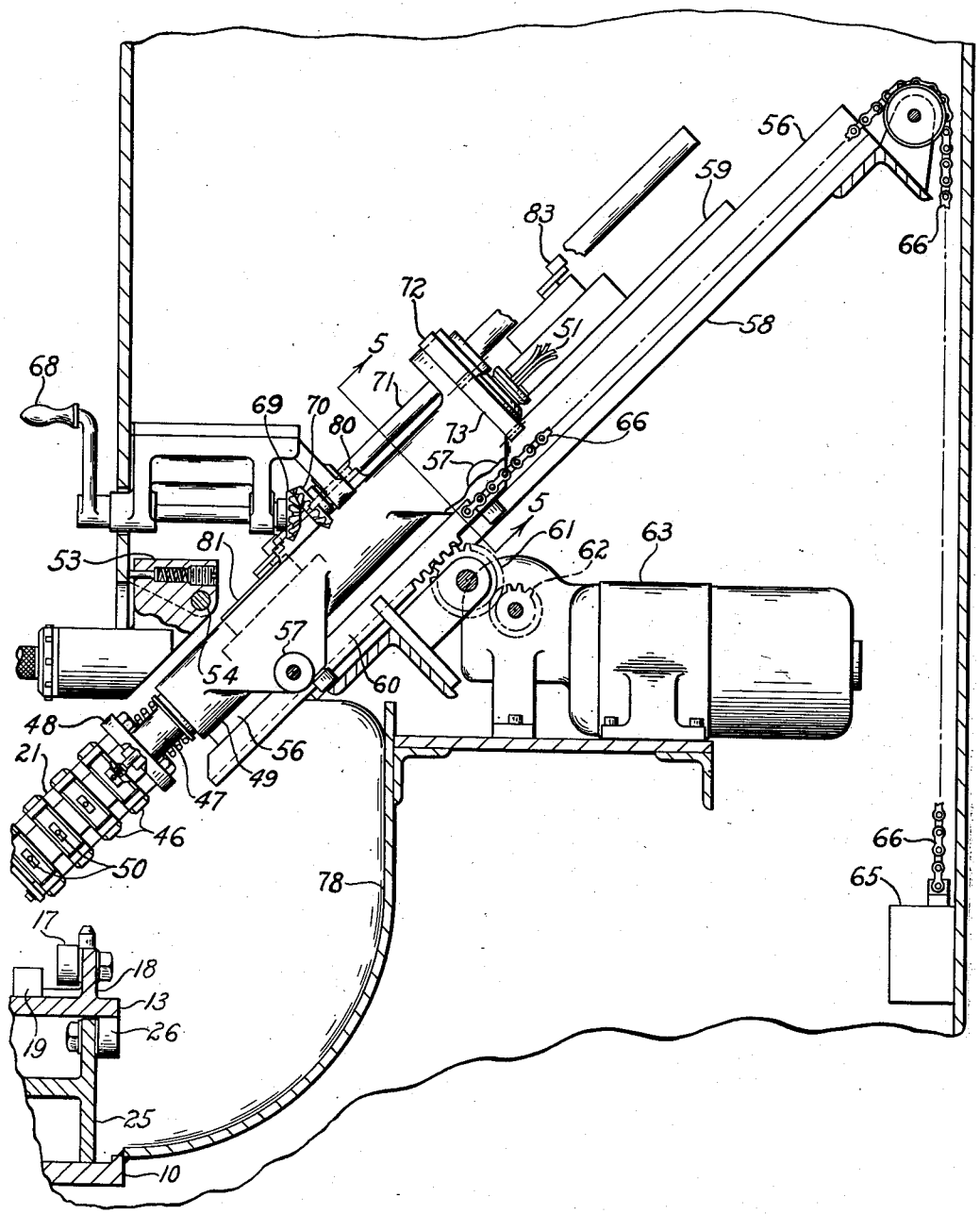
Fig. 4 is a vertical section looking at one end of the slide mechanism that controls the block entering gauging heads.

The several operating bars 49 of the gauging heads are mounted on a slide 56, see Figs. 4 and 5. Rollers 57 are rotatably supported by the slide and operate in tracks formed by a guide rail 58 and a cover rail 59 at each side of the slide. The slide 56 has a rack 60 which meshes with an operating gear 61 driven by a pinion 62 which is operated by an electric motor under the control of the operator. When the motor is driven so the gear 61 rotates in a counterclockwise direction, the slide is projected downwardly to the position shown in Fig. 4, reverse movements of the motor causing the slide to be retracted. A counterweight 65 connected by a chain 66 to the slide counterbalances the weight of the slide. The slide 56 operates at the proper angle in an upwardly projecting portion of the base, this upwardly projecting portion being recessed as indicated at 78 to provide room for the ends of the carrier as the carrier is rotated.

Each gauging head may be rotated about its own axis in the projected position by means of a hand lever 68 which simultaneously rotates all the gauging heads, this lever operating bevel pinion 69 meshing with a pinion 70 on a control shaft 71, which is splined to a spur gear 72 meshing with a spur gear 73 that controls rotational movement of the operating bar 49. As will be apparent from Fig. 5, the gear 72 meshes with the spur gears 73 of a pair of adjacent bars 49 and the gears 73 are connected through idler pinions 74 to the gears 75 on the operating bars of the two end gauge heads so that all the gauge heads will be similarly and simultaneously moved about their own axes by the operator in order to inspect the diametrical dimensions of the cylinder bores in different diametrical planes and determine if an out-of-round condition exists.

As will now be apparent a cylinder block may be applied to the support 11, rolling on the rollers 14 and approximately positioned by the guide rails 15 so that the axis of symmetry of the block is approximately centered in the desired line of advance. The operator then pushes the block onto the carrier and at the same time a previously gauged block may be pushed off the carrier onto the rollers 14 on the support 12. At this time the gauging heads are of course raised or retracted and the locating pins 28 and 29 are retracted or lowered. Having approximately centered the block on the carrier, the operator through control of the lever 43 causes the pin holding bars 41 to move upwardly, releasing the locating pins 28 and 29 so that their tapered ends enter the locating holes in the cylinder block and exactly position the cylinder block ready for gauging. At this time of course the lever 37 holds the carrier against rotational movement. The operator then energizes the motor 63 by the starting switch 79 causing all the gauging heads to descend until a stop lug 80 on the slide 56 engages and operates a limit switch 81 which stops the motor. The operator then gauges the several bores of one series and applies the stamps to the cylinder block adjacent those bores. He then operates the motor control switch to retract the slide 56, the motor being automatically stopped by a limit switch 83 which is engaged by stop 80 when the slide is elevated. He then pulls outwardly on the lever 37 to release the carrier for rotation and turns the carrier 180 degrees, locking the carrier again by releasing the lever 37. During this operation the bars 39 and 40 are elevated so that the position of the locating pins 28 and 29 is not disturbed. The second series of cylinder bores is then gauged, the gauge heads being raised when this is completed. The cylinder block is then rolled off of the carrier and another block supplied to the carrier. Due to the symmetrical arrangement of the carrier, it is not necessary to move the carrier more than 180 degrees for each block gauged and the operator is permitted to move one block off the carrier by engaging it and pushing it with another block supplied to the carrier at the same time.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus for gauging two series of angularly related bores of a cylinder block or the like comprising a base having spaced block supports and a carrier rotatably mounted on said base between said block supports for movement about a vertical axis, said carrier having a track in substantially horizontal alignment with both of said block supports the construction being such that a block may be moved horizontally from one block support to a gauging station on the carrier and from the carrier to the other block support in either of two positions of the carrier 180 degrees apart, a series of block engaging heads, slide means mounted on the base and supporting said heads for movement at an angle to the vertical into and out of a series of bores of a block on the carrier, means associated with said heads for gauging the size of the bores of the block, releasable block positioning means on the carrier to position the block in a predetermined location thereon and releasable locking means for positioning the carrier in either of its two positions displaced 180 degrees apart.

2. Gauging apparatus for gauging a series of inclined bores of a cylinder block or the like comprising a base having spaced block supports and a carrier rotatably mounted on said base between said block supports, said carrier having a track in substantially horizontal alignment with both of said block supports the construction being such that a block may be moved horizontally from one block support to a gauging station on the carrier and from the carrier to the other block support, a series of block engaging heads, slide means mounted on the base and supporting said heads for movement at an angle to the vertical into and out of a series of bores of a block on the carrier, means associated with said heads for gauging the size of the bores of the block, a plurality of releasable block positioning means symmetrically located on the carrier to position the block in a predetermined location thereon regardless of which end of the block is first advanced to the carrier, and releasable locking means for positioning the carrier in either of two positions displaced 180 degrees apart.

3. Gauging apparatus for gauging a series of angularly related bores of a cylinder block or the like comprising a base having spaced block supports and a carrier rotatably mounted on said base between said block supports, said carrier having a track in substantially horizontal alignment with both of said block supports the construction being such that a block may be moved horizontally from one block support to a gauging station on the carrier and from the carrier to the other block support, a series of block engaging heads, slide means mounted on the base and supporting said heads for movement into and out of a series of bores of a block on the carrier, means associated with said heads for gauging the diameter of the bores of the block, means for positioning the block in gauging position, releasable locking means for positioning the carrier in either of two positions displaced 180 degrees apart and means for simultaneously rotating said block engaging heads about their respective axes.

4. Gauging apparatus for gauging the cylinder bores of a V type cylinder block comprising a base having spaced block supports and a carrier rotatably mounted on said base between said block supports, said carrier being of symmetrical construction and having a track in horizontal alignment with both of said block supports so that a block can be supplied to either end thereof from one of the block supports and can move from either end thereof to the other block support and the construction being such that a block may be moved horizontally from one block support to a gauging station on the carrier as another block on the carrier is moved therefrom to the other block support, the base having an upwardly extending portion adjacent the carrier, a series of block engaging heads, slide means mounted on the upwardly extending portion of the base and supporting said heads for movement at an angle to the vertical into and out of a series of bores of a block on the carrier, means associated with said heads for gauging the size of the bores of the block, a plurality of retractable block positioning members operably mounted on the carrier to position the block in a predetermined location thereon, means for simultaneously retracting said positioning members, and releasable locking means for positioning the carrier against rotation in either of two positions in both of which a series of bores is aligned with the block engaging heads.

5. Gauging apparatus as set forth in claim 4, said block positioning members comprising spring projected pins mounted for vertical movement on the carrier at diagonally opposite portions thereof; and said retracting means being mounted for movement on the base and engageable with said pins.

6. Gauging apparatus as set forth in claim 4, said block supports and carrier each having a series of block supporting rollers on which the cylinder block is carried as it is moved to and from the gauging station and during the gauging operation.

7. An apparatus of the character described for performing an operation on the angularly related bores of a V-type cylinder block comprising an extended base portion having similar vertically projected block supports at each end thereof, the length of each block support, and the space therebetween, being substantially equal to the length of the block being operated upon, a track along each block support, a symmetrical carrier rotatably mounted on said base about a vertical axis between said block supports, a track on said carrier in horizontal alignment with both of said block support tracks and substantially bridging the space between the block support tracks when aligned therewith, means for positioning a block in a predetermined position on said carrier track, means cooperating between said carrier and said base for locking said carrier in alignment with said block supports in two positions 180 degrees apart, a series of heads corresponding in number to the cylinder bores in one bank of the cylinder block, means slidably supporting said heads at an angle to the vertical alongside said carrier and along the axes of one bank of bores when a block is positioned on the carried in one of its two locked positions, and means connected to said heads for simultaneously projecting and retracting the heads into and out of operative association with each bank of cylinder bores as the carrier is positioned in each of its two 180-degree positions.

WILLIS FAY ALLER.

References Cited in the file of this patent

UNITED STATES PATENTS

| Number | Name | Date |
| --- | --- | --- |
| 495,683 | Rigby | Apr. 18, 1893 |
| 1,622,060 | Stoop | Mar. 22, 1927 |
| 1,805,054 | Spring | May 12, 1931 |
| 2,108,823 | Lyon | Feb. 22, 1938 |
| 2,270,590 | Johnson | Jan. 20, 1942 |
| 2,284,325 | Kline | May 26, 1942 |
| 2,370,219 | Aller | Feb. 27, 1945 |
| 2,391,487 | Snader | Dec. 25, 1945 |
| 2,395,518 | Svenson | Feb. 26, 1946 |
| 2,432,487 | Paxman | Dec. 9, 1947 |
| 2,519,177 | Chenault | Aug. 15, 1950 |
| 2,571,161 | Poole | Oct. 16, 1951 |